US011568511B2

(12) United States Patent
McMurrough et al.

(10) Patent No.: US 11,568,511 B2
(45) Date of Patent: Jan. 31, 2023

(54) SYSTEM AND METHOD FOR SENSING AND COMPUTING OF PERCEPTUAL DATA IN INDUSTRIAL ENVIRONMENTS

(71) Applicant: Cloud 9 Perception, Inc., Arlington, TX (US)

(72) Inventors: Christopher D. McMurrough, Arlington, TX (US); James Francis Staud, Fort Worth, TX (US)

(73) Assignee: Cloud 9 Perception, Inc., Arlington, TX (US)

( * ) Notice: Subject to any disclaimer, the term of this patent is extended or adjusted under 35 U.S.C. 154(b) by 192 days.

(21) Appl. No.: 17/159,605

(22) Filed: Jan. 27, 2021

(65) Prior Publication Data

US 2021/0150661 A1 May 20, 2021

Related U.S. Application Data

(63) Continuation of application No. 16/015,550, filed on Jun. 22, 2018, now Pat. No. 10,909,650.

(Continued)

(51) Int. Cl.
*G06T 7/70* (2017.01)
*G06T 1/20* (2006.01)
(Continued)

(52) U.S. Cl.
CPC ............... *G06T 1/20* (2013.01); *G06T 7/001* (2013.01); *G06T 7/0004* (2013.01); *G06T 7/11* (2017.01);
(Continued)

(58) Field of Classification Search
CPC ......... G06T 1/20; G06T 7/0004; G06T 7/001; G06T 7/11; G06T 7/593; G06T 7/60;
(Continued)

(56) References Cited

U.S. PATENT DOCUMENTS 4,998,005 A 3/1991 Rathi et al.
8,995,756 B2 3/2015 Lee et al.
(Continued)

OTHER PUBLICATIONS

Rusu, Radu Bogdan and Cousins, Steve, 3D is here: Point Cloud Library (PCL), May 2011, https://pointclouds.org/documentation/ retrieved from the internet Sep. 10, 2020, believed available since May 2011.

(Continued)

*Primary Examiner* — Phuoc Tran
(74) *Attorney, Agent, or Firm* — Scheef & Stone, LLP; Robin L. Barnes

(57) ABSTRACT

A sensing and computing system and method for capturing images and data regarding an object and calculating one or more parameters regarding the object using an internal, integrated CPU/GPU. The system comprises an imaging system, including a depth imaging system, color camera, and light source, that capture images of the object and sends data or signals relating to the images to the CPU/GPU, which performs calculations based on those signals/data according to pre-programmed algorithms to determine the parameters. The CPU/GPU and imaging system are contained within a protective housing. The CPU/GPU transmits information regarding the parameters, rather than raw data/signals, to one or more external devices to perform tasks in an industrial environment related to the object imaged.

20 Claims, 14 Drawing Sheets

Related U.S. Application Data

(60) Provisional application No. 62/523,878, filed on Jun. 23, 2017.

(51) Int. Cl.
  *G06T 7/593* (2017.01)
  *G06T 7/00* (2017.01)
  *G06T 7/90* (2017.01)
  *G06T 7/60* (2017.01)
  *G06T 7/11* (2017.01)

(52) U.S. Cl.
  CPC .............. *G06T 7/593* (2017.01); *G06T 7/60* (2013.01); *G06T 7/70* (2017.01); *G06T 7/90* (2017.01); *G06T 2200/28* (2013.01); *G06T 2207/10024* (2013.01); *G06T 2207/10028* (2013.01); *G06T 2207/10048* (2013.01)

(58) Field of Classification Search
  CPC ......... G06T 7/70; G06T 7/90; G06T 2200/28; G06T 2207/10024; G06T 2207/10028; G06T 2207/10048
  See application file for complete search history.

(56) References Cited

U.S. PATENT DOCUMENTS

| | | | |
|---|---|---|---|
| 9,342,610 B2 | 5/2016 | Liu et al. | |
| 10,573,018 B2* | 2/2020 | Kutliroff | G06T 7/33 |
| 11,030,436 B2* | 6/2021 | Lei | G06V 20/647 |
| 2014/0114461 A1 | 4/2014 | Hermary et al. | |
| 2015/0039121 A1 | 2/2015 | Hermary et al. | |
| 2016/0349043 A1 | 12/2016 | Lee et al. | |
| 2017/0008654 A1 | 1/2017 | Boothman et al. | |
| 2017/0054966 A1 | 2/2017 | Zhou et al. | |
| 2017/0091957 A1 | 3/2017 | Driegen et al. | |
| 2017/0301004 A1 | 10/2017 | Chirnomas | |
| 2018/0033146 A1 | 2/2018 | Bleyer et al. | |
| 2018/0245316 A1 | 8/2018 | Forcash et al. | |
| 2018/0327196 A1 | 11/2018 | Sullivan et al. | |
| 2018/0370727 A1 | 12/2018 | Hance et al. | |

OTHER PUBLICATIONS

Ujjwalkarn, An Intuitive Explanation of Convolutional Neural Networks, The Data Science Blog, Aug. 11, 2016, https://ujjwalkarn.me/2016/08/11/intuitive-explanation-convnets/ retrieved from the internet Sep. 9, 2020, posted on Aug. 11, 2016.

Convolutional neural network, Wikipedia, Mar. 16, 2017, https://web.archive.org/web/20170316184453/http://en.wikipedia.org/wiki/Convolutional_neural_network; retrieved from the internet Sep. 10, 2020, available as of Mar. 16, 2017.

Google Brain Team, TensorFlow, Jun. 21, 2017, https://web.archive.org/web/20170621214347/https://en.wikipedia.org/wiki/TensorFlow; retrieved from the internet Sep. 10, 2020, availalbe as of Jun. 21, 2017.

Point Cloud Library (PCL), Jun. 8, 2017, https://web.archive.org/web/20170608170156/https://pointsclouds.org/ retrieved from the internet Sep. 10, 2020, available as of Jun. 8, 2017.

Point Cloud Library (PCL), News Articles, Jun. 6, 2017, https://web.archive.org/web/20170606130737/https://pointclouds.org/news/.

\* cited by examiner

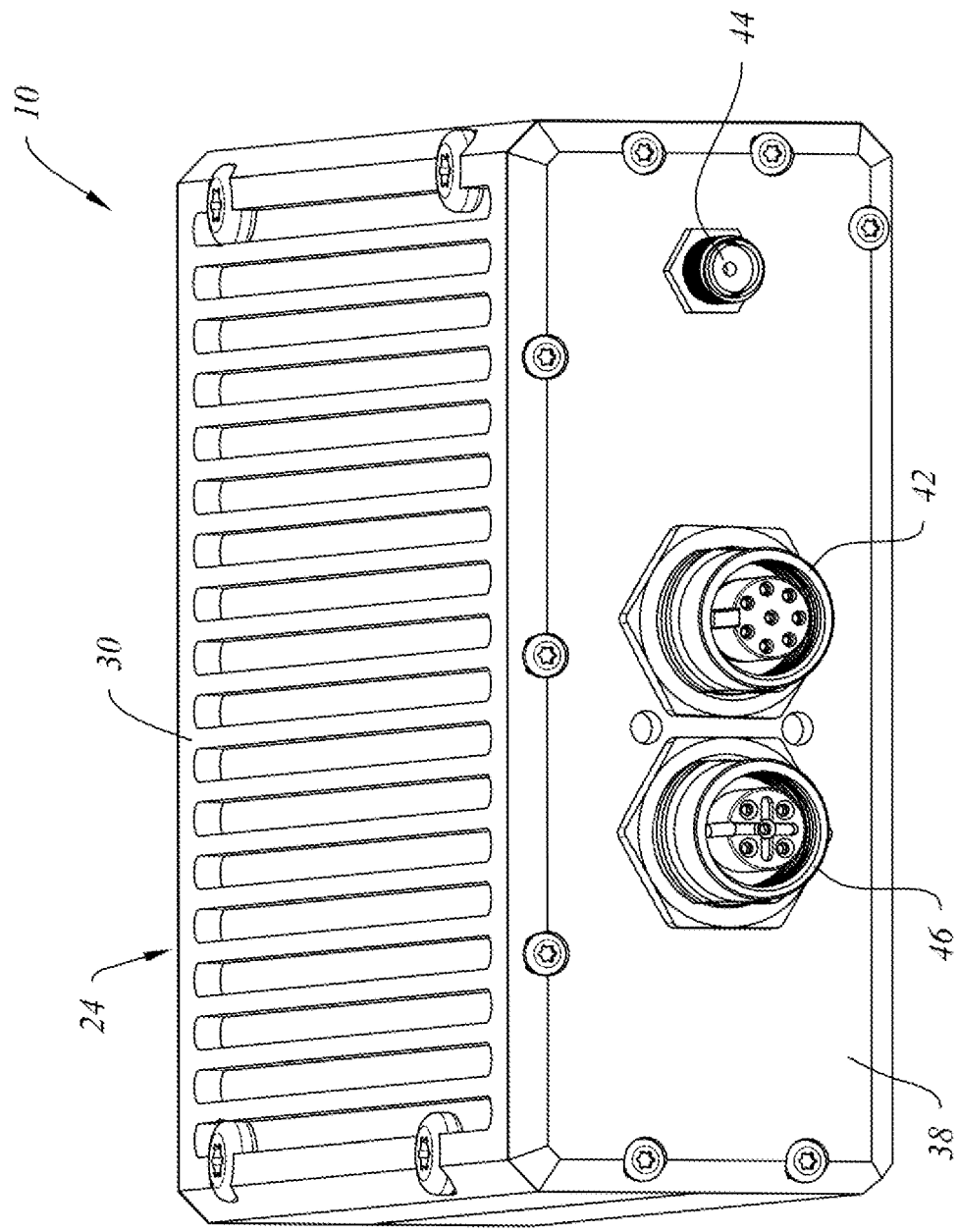

SYSTEM AND METHOD FOR SENSING AND COMPUTING OF PERCEPTUAL DATA IN INDUSTRIAL ENVIRONMENTS

CROSS-REFERENCE TO RELATED APPLICATIONS

This application is a continuation of U.S. application Ser. No. 16/015,550 filed on Jun. 22, 2018, now U.S. Pat. No. 10,909,650, which claims the benefit of U.S. Provisional Application No. 62/523,878 filed on Jun. 23, 2017.

BACKGROUND OF THE INVENTION

1. Field of the Invention

This invention relates to a system and method for sensing parameters regarding an object in an industrial environment, such as measurements of an article in a manufacturing process to ensure the article meets specifications or selection and robotic retrieval of a product from storage, calculating or determining data based on those parameters using integrated processors, and sending the data or signals corresponding to the data to external components to control the industrial process.

2. Description of Related Art

The ability to perform controlled interaction with the physical environment is a fundamental requirement for automated machinery in a variety of applications. These interactions generally involve a fusion of exteroceptive sensors, computational resources, and manipulation by mechanical means. Common applications may include robotic bin picking, loading and unloading of product from wooden pallets, packaging of materials for shipping, and pick and place applications.

The exteroceptive sensing capabilities typically used in prior art material handling applications are often provided by 2D monocular cameras, laser scanners, ultrasonic ranging devices, stereo cameras, structured light or time-of-flight cameras. Regardless of the exact sensing methodology that is employed, the prior art systems require external computing hardware (a CPU and/or GPU) for extracting environmental knowledge from the raw sensor data. This computing hardware, in general, will compute the necessary mechanical actions required to achieve a desired motion goal and transmit these high-level commands to an industrial robot, conveyor, or other mechanical subsystem. The external computing hardware is often realized as a separate desktop computer, server, or industrial computing module. For example, U.S. Pat. No. 4,998,005 discloses the use of a camera connected to an external computer (a vision processor) in which the camera sends a video signal to the external computer, which uses the video signal to determine data, such as weld location, the rate of delivery of weld powder, laser power intensity, and the speed at which the weld is applied.

There have been many advances in this type of technology in recent years, including the use of 3D technology. For example, U.S. Patent Application Publication No. 2015/0039121 discloses a 3D machine vision scanning system that uses a scanner head to obtain raw data from a target object, an information extraction module that processes the raw data into information that can be used to automate and control an industrial process. However, the '121 publication still requires the use of an external computer to receive data or signals from the scanner to convert and process that data/signals into useful information. As another example, U.S. Pat. No. 8,995,756 discloses a 3D Vision Processing Unit (3VPU) that can be coupled to a mobile device, such as a smart phone, to allow use of the mobile device's camera for capturing image data. The mobile device will typically not have sufficient internal processing power to do any sophisticated data processing, but the connected 3VPU acts as an eternal computer to process the data.

The reliance on external computing hardware in material handling applications introduces several drawbacks. First, differences in size and power requirements of the separate exteroceptive sensor and computing module may overly constrain mounting, thermal management, and wiring options. Second, introduction of separate hardware systems increases overall design complexity, increases costs, and exposes additional potential points of failure. Finally, data transmission physical length, bandwidth, and cabling options between the sensing and computing modules may be limited by this approach. There is a need for an efficient integrated sensing and computing system and method that will address one or more of these issues.

SUMMARY OF THE INVENTION

This invention provides a system and method to integrate sensing and computing systems into a single field deployable device. According to one preferred embodiment, a sensing and computing system comprises a depth imager system (most preferably a digital imaging system capable of providing multiple depth measurements in a single image frame), a color camera aligned with the depth imager for recording hue and texture data, a light source, and an integrated CPU with multiple GPU (Graphics Processing Unit) processing cores for filtering, fusing, and processing/calculating signals from the color camera and depth imager system based on pre-programmed algorithms into 3D data regarding the object being imaged. The CPU/GPU is preferably capable of generating 3D data in the form of a "point cloud", comprising a collection of 3D points in space each with a color value corresponding to the imaged object. According to another preferred embodiment, a sensing and computing system further comprises an external network interface for communicating with other devices, such as a controller for the industrial process in which the sensing and computing system is being used, allowing signals and/or data from the CPU/GPU to be sent to the other devices so that action may be taken as necessary based on the signals and/or data. Integration with other devices is facilitated by external interfaces, such as Ethernet, Wi-Fi, serial communications, or general purpose digital input/output.

According to another preferred embodiment, a sensing and computing system comprises a ruggedized housing suitable for industrial environments, with the depth imager, camera, and CPU/GPU being disposed inside the housing. Most preferably, the housing comprises one or more glass optical windows, allowing the light source to project light through the window onto the object to be imaged and allowing images to be taken by the depth imager and camera of the object outside the housing while protecting the imaging optics from the environment, and a removable protective optical window covering plate. Most preferably, one or more connectors suitable for industrial environments are disposed through a wall of the housing to allow the CPU/GPU to be connected to external devices and an external power source.

According to another preferred embodiment, the CPU sends signals to the depth imager system, light source, and color camera to initiate capturing one or more images of the object to be imaged. According to another preferred embodiment, the CPU/GPU receives data and/or signals from the depth imager system and color camera representing the images of the object captured by the imager system and camera. The CPU/GPU preferably comprises one or more stored or pre-programmed algorithms for computing the presence of geometric models, such as planes, cylinders, spheres, or other shapes, based on the data or signals received from the depth imager and/or camera. Each algorithm utilized in the detection pipeline for a particular object or target is designed to take advantage of multiple GPU processing cores in order to reduce computational time. The output of the CPU/GPU is computed data or information that can be used by a controller in the industrial process without further computation of the raw data/signals from the imaging devices. Rather than sending raw sensor imaging data to an external device network for further processing, sensing and computing systems according to preferred embodiments of the invention utilize the integrated CPU/GPU and algorithms to send direct detection results in the form of coordinates and other meta data. This greatly reduces bandwidth requirements and system complexity.

While typical embedded computing modules would not be able to perform the mathematical and algorithmic processing necessary to extract useful handling information in a reasonable amount of time, integrated sensing and computing systems according to preferred embodiments of the invention have the advantage of parallel processing capabilities provided by GPUs to drastically increase performance and allow for complex image processing and geometric processing to be performed in real time. The integration of imaging sensors with graphical processing units into a single module reduces the complexity and cost of machine vision systems, while increasing the system mean time to failure. Given that these integrated modules can more efficiently utilize available space and power, these preferred embodiments according to the invention place far fewer constraints on mounting, data transmission length, and thermal management.

BRIEF DESCRIPTION OF THE DRAWINGS

The system and method of the invention is further described and explained in relation to the following drawings wherein:

FIG. 3 is a rear perspective view of the embodiment of FIG. 2, showing external network and power connections;

DESCRIPTION OF THE PREFERRED EMBODIMENTS

Figure 1:
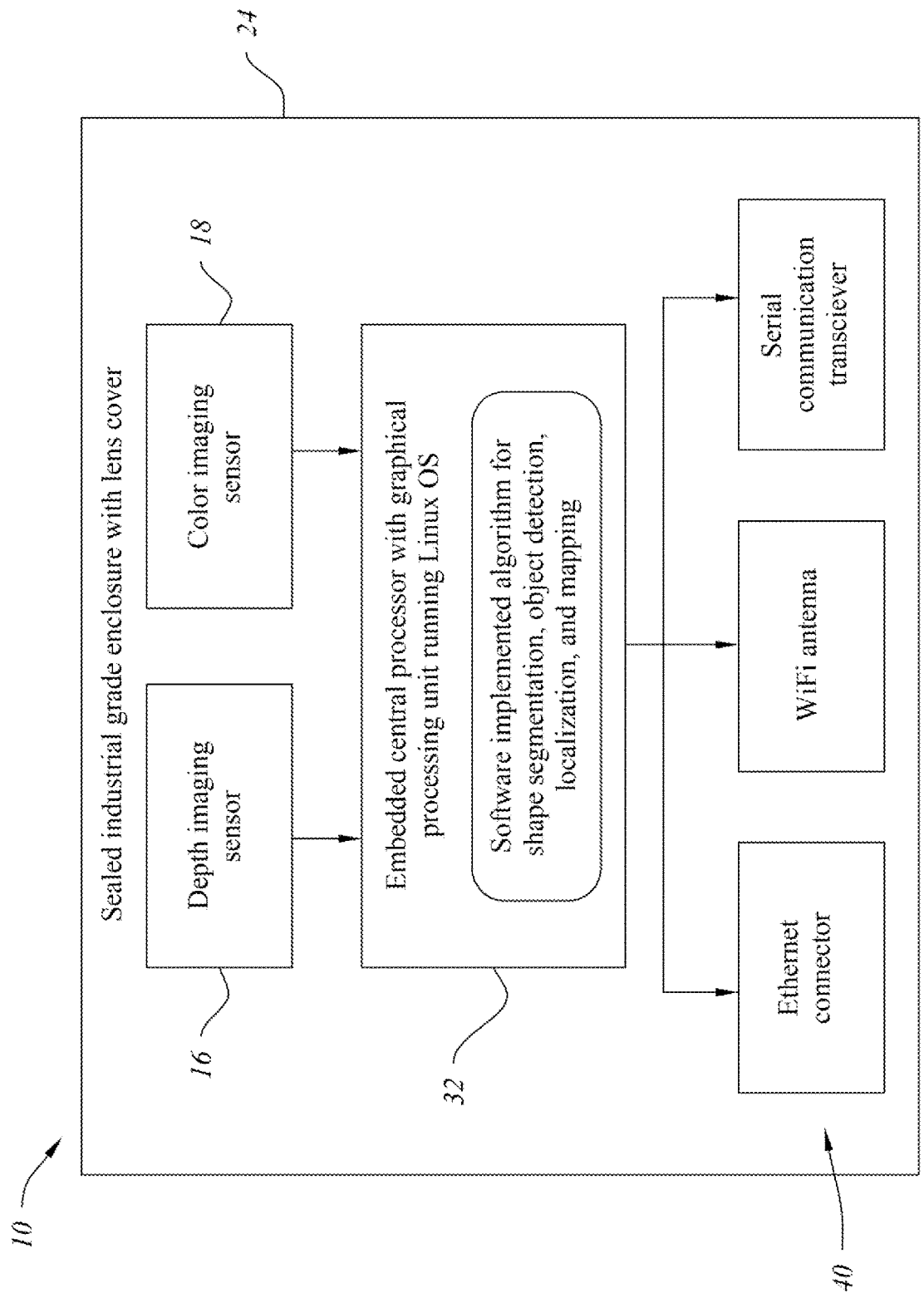
FIG. 1 is a dataflow diagram showing main functional components and connections in one preferred embodiment.
Figure 2:
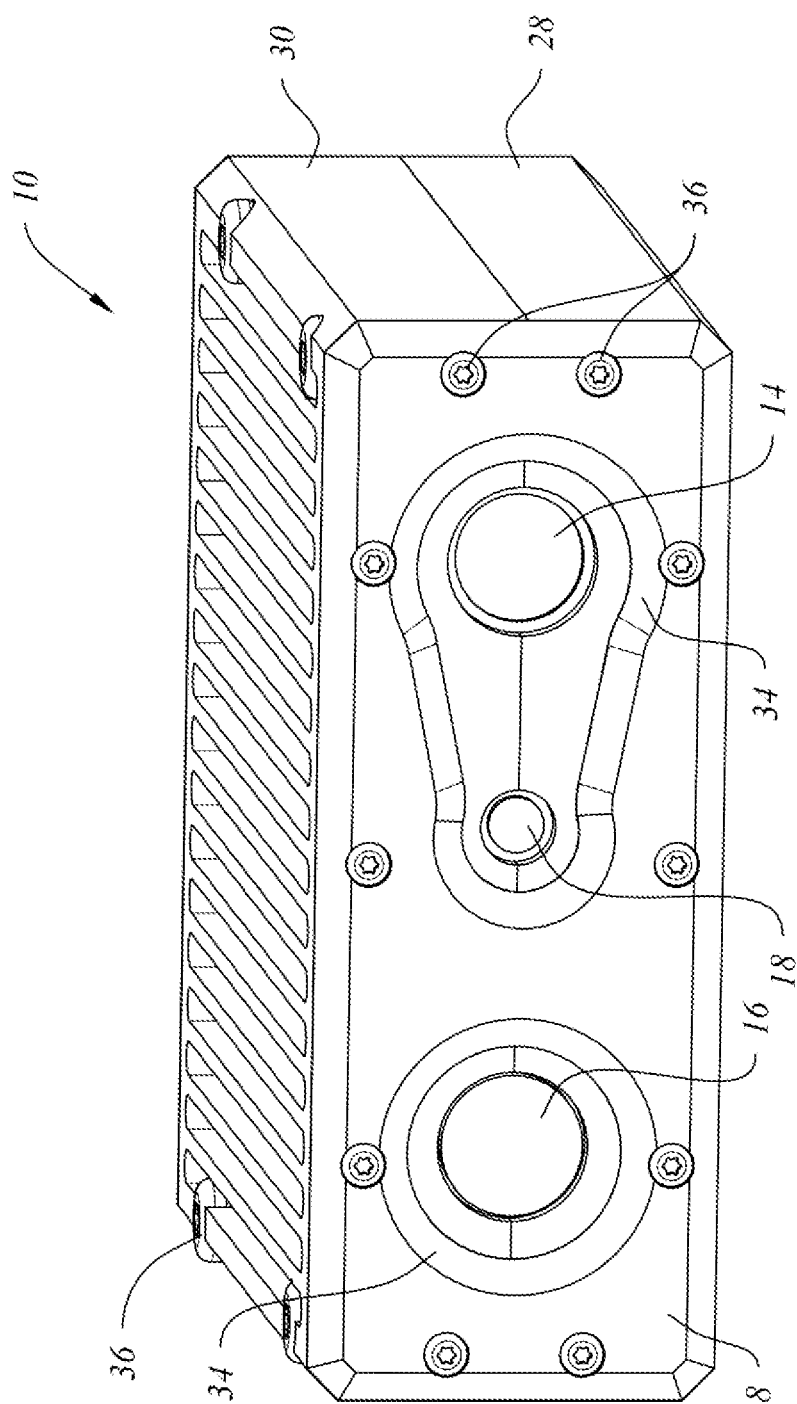
FIG. 2 is a front perspective view of one preferred embodiment of a sensing and computing system according to the invention.
Figure 4A:
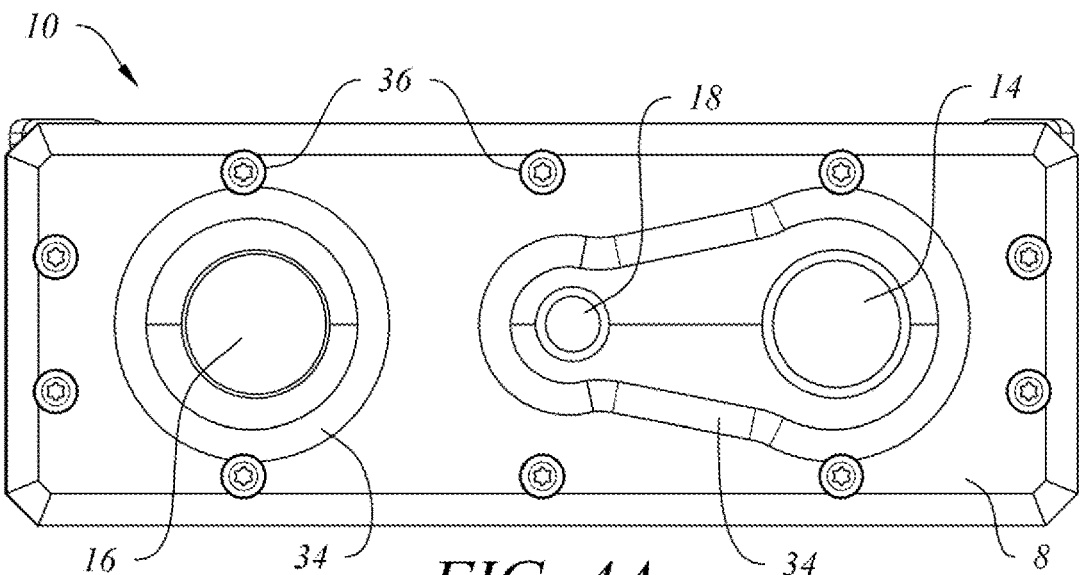
FIG. 4A is a front elevation of the embodiment of FIG. 2.
Figure 4B:
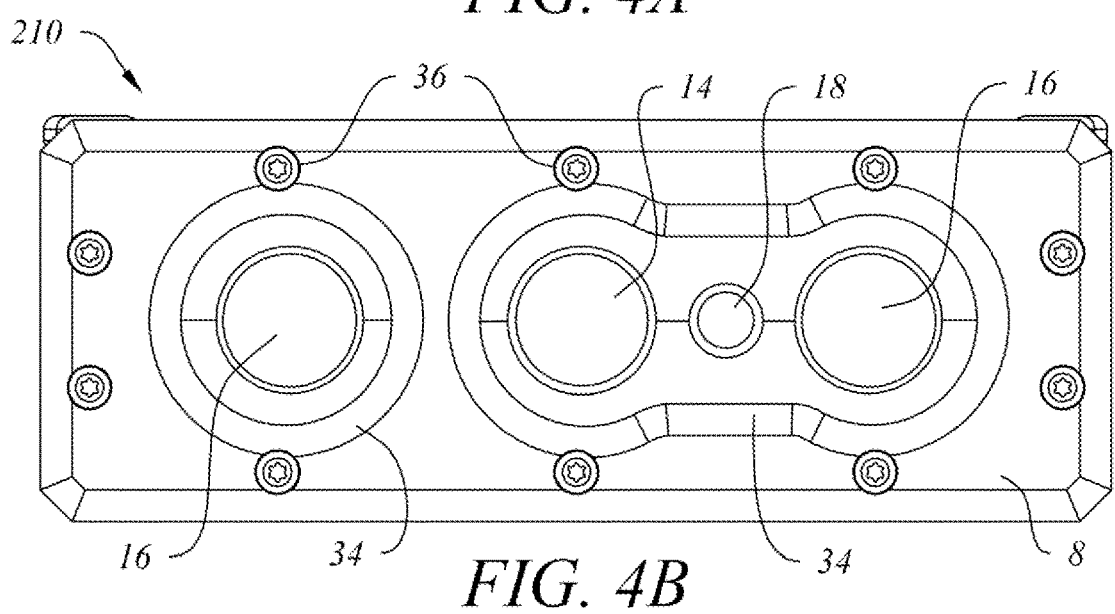
FIG. 4B is a front elevation of another preferred embodiment of a sensing and computing system according to the invention.
Figure 5:
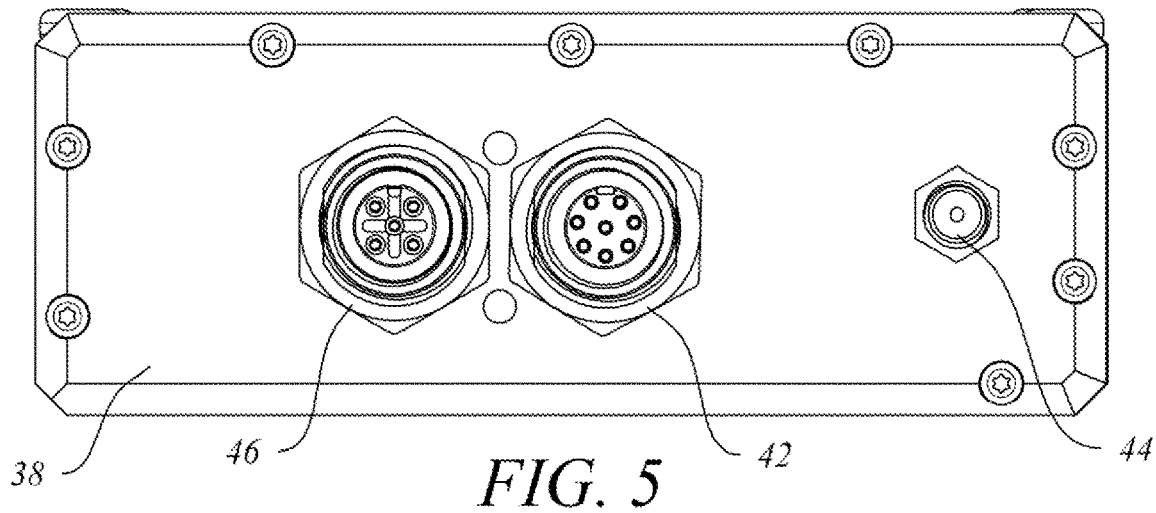
FIG. 5 is a rear elevation of the embodiment of FIG. 2.
Figure 6:
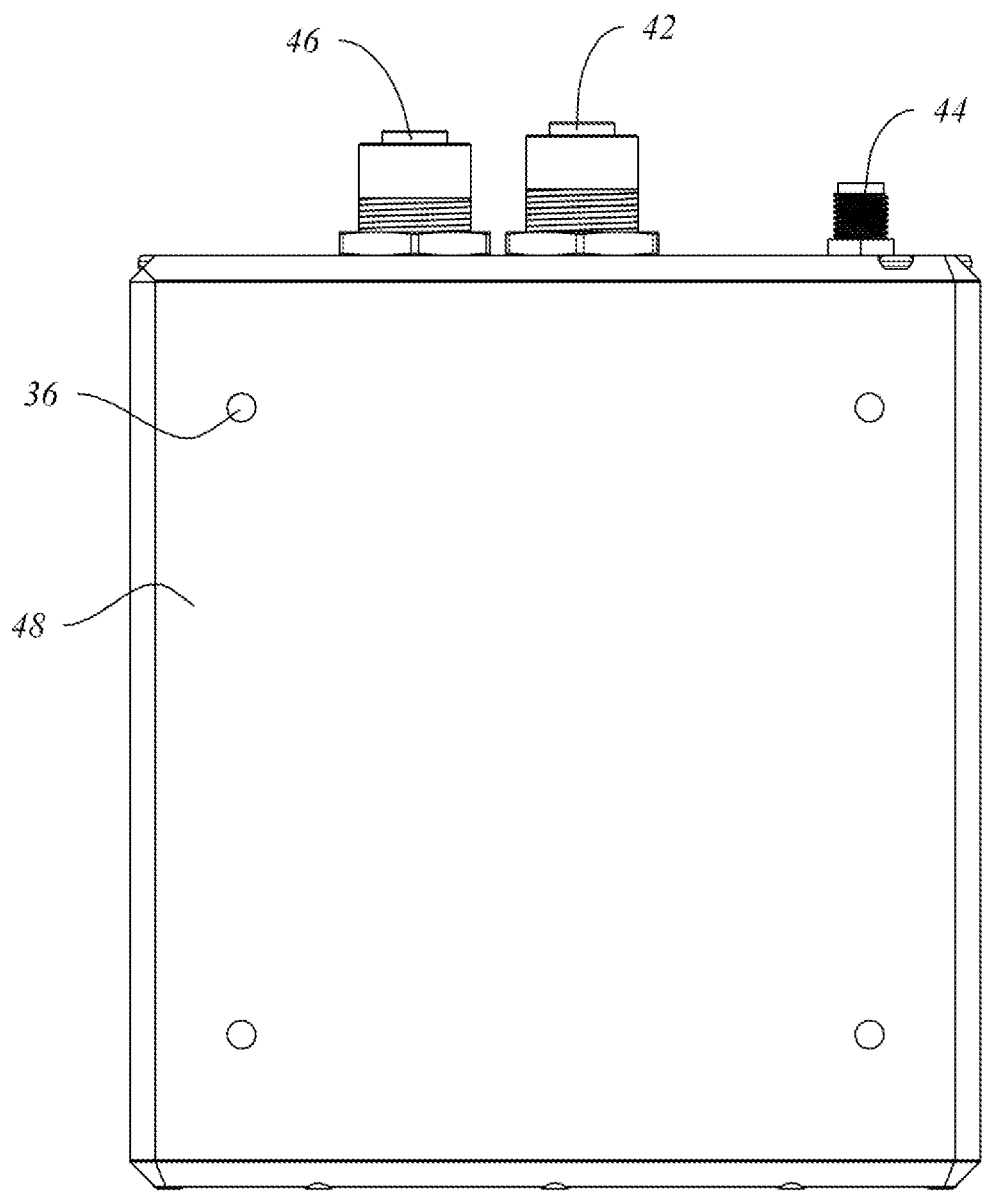
FIG. 6 is a bottom plan view of the embodiment of FIG. 2.
Figure 7:
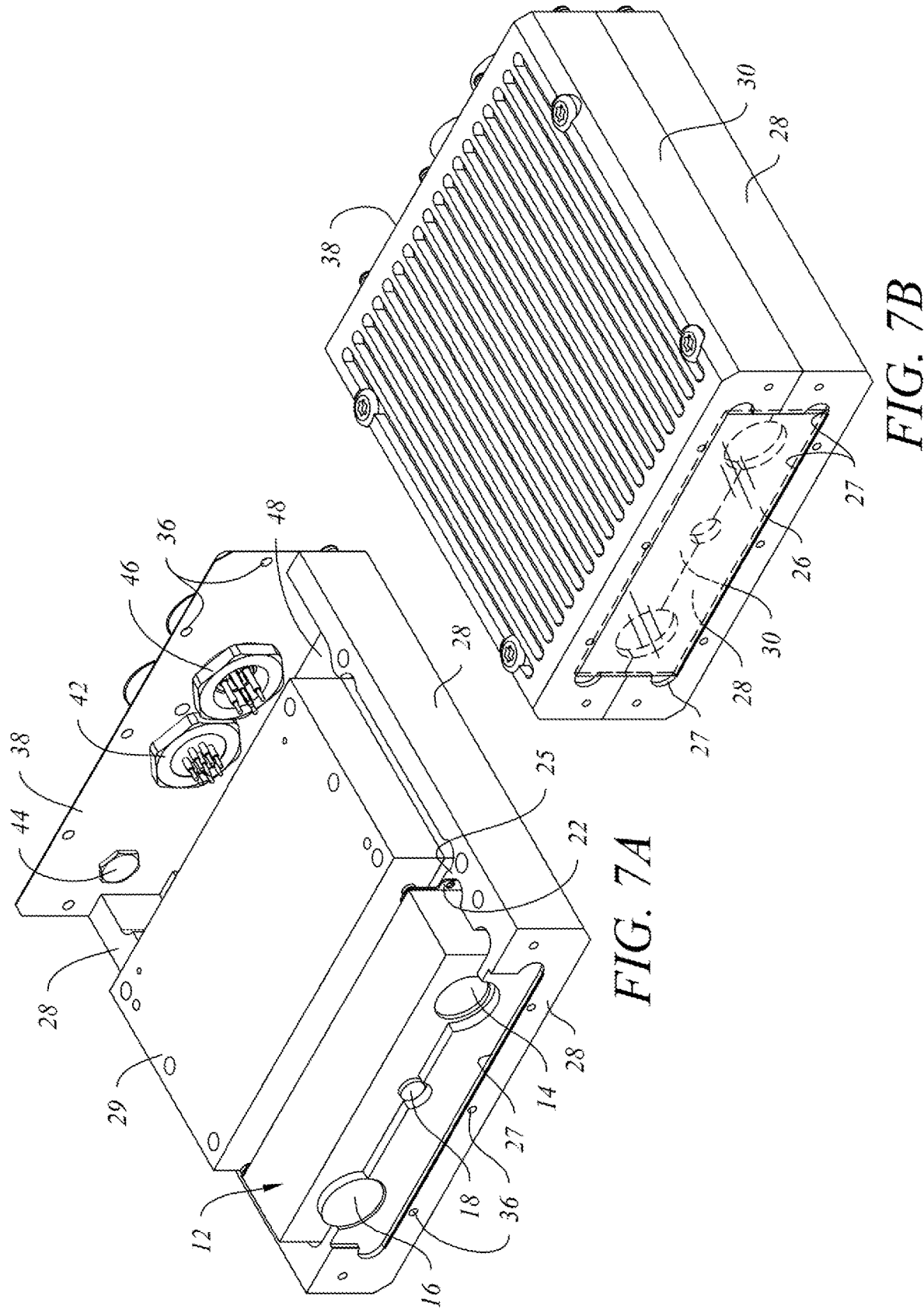
FIG. 7A is an interior top perspective view of the embodiment of FIG. 2 with the top cover of exterior housing removed.
FIG. 7B is a top perspective view of the embodiment of FIG. 7A with the top cover in place.
Figure 8:
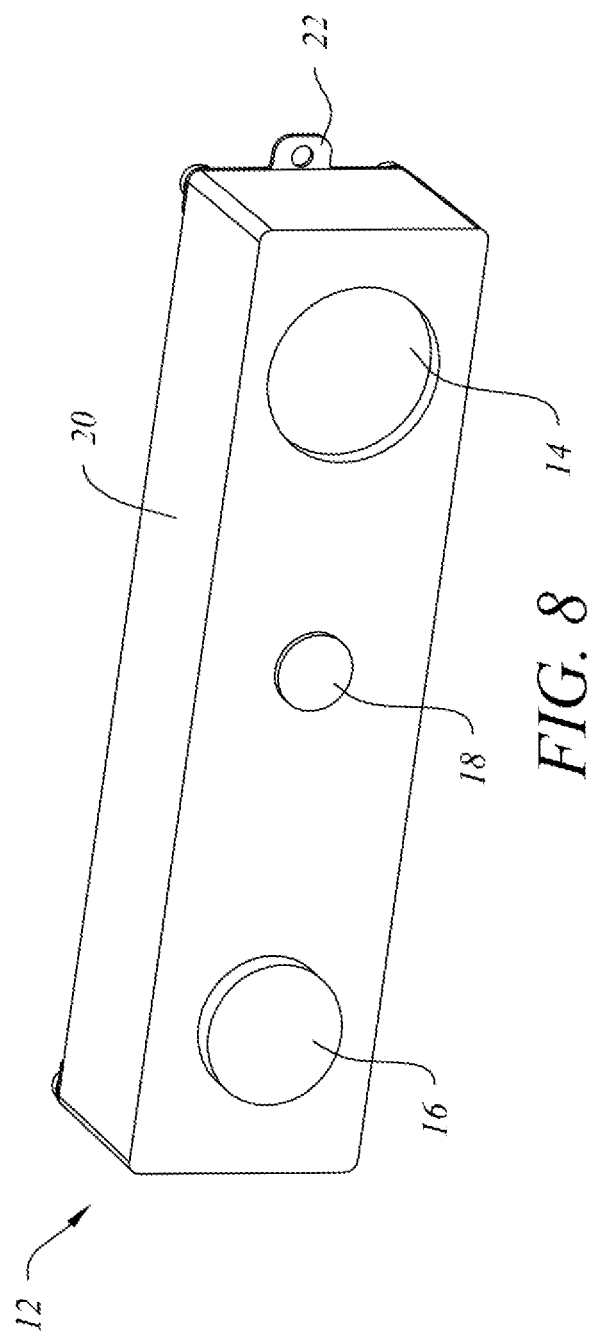
FIG. 8 is a front perspective view of a preferred embodiment of an imaging system according to the invention.
Figure 9:
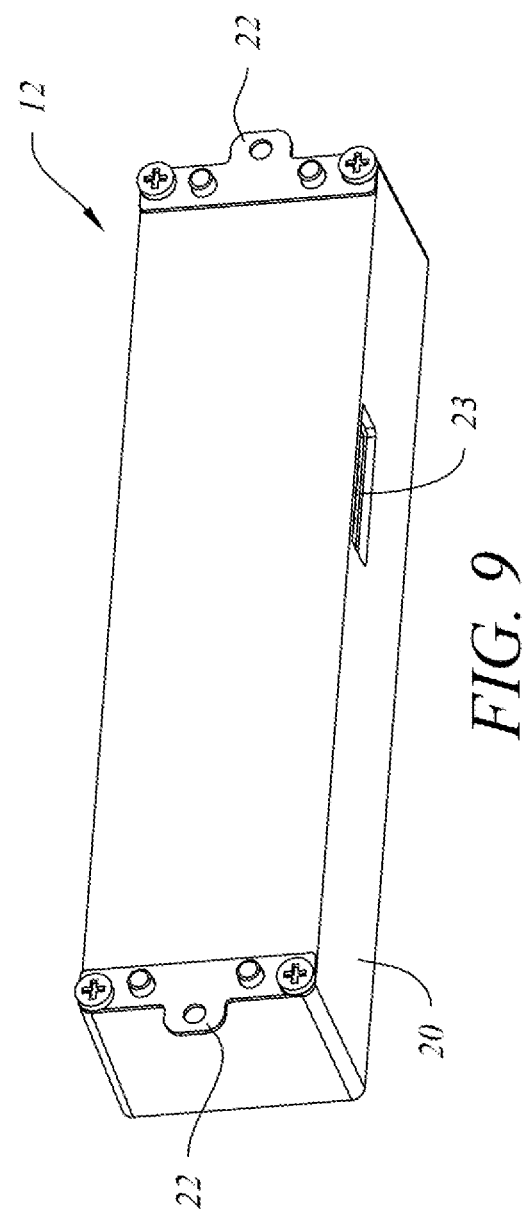
FIG. 9 is a rear perspective view of the embodiment of FIG. 8.
Figure 10:
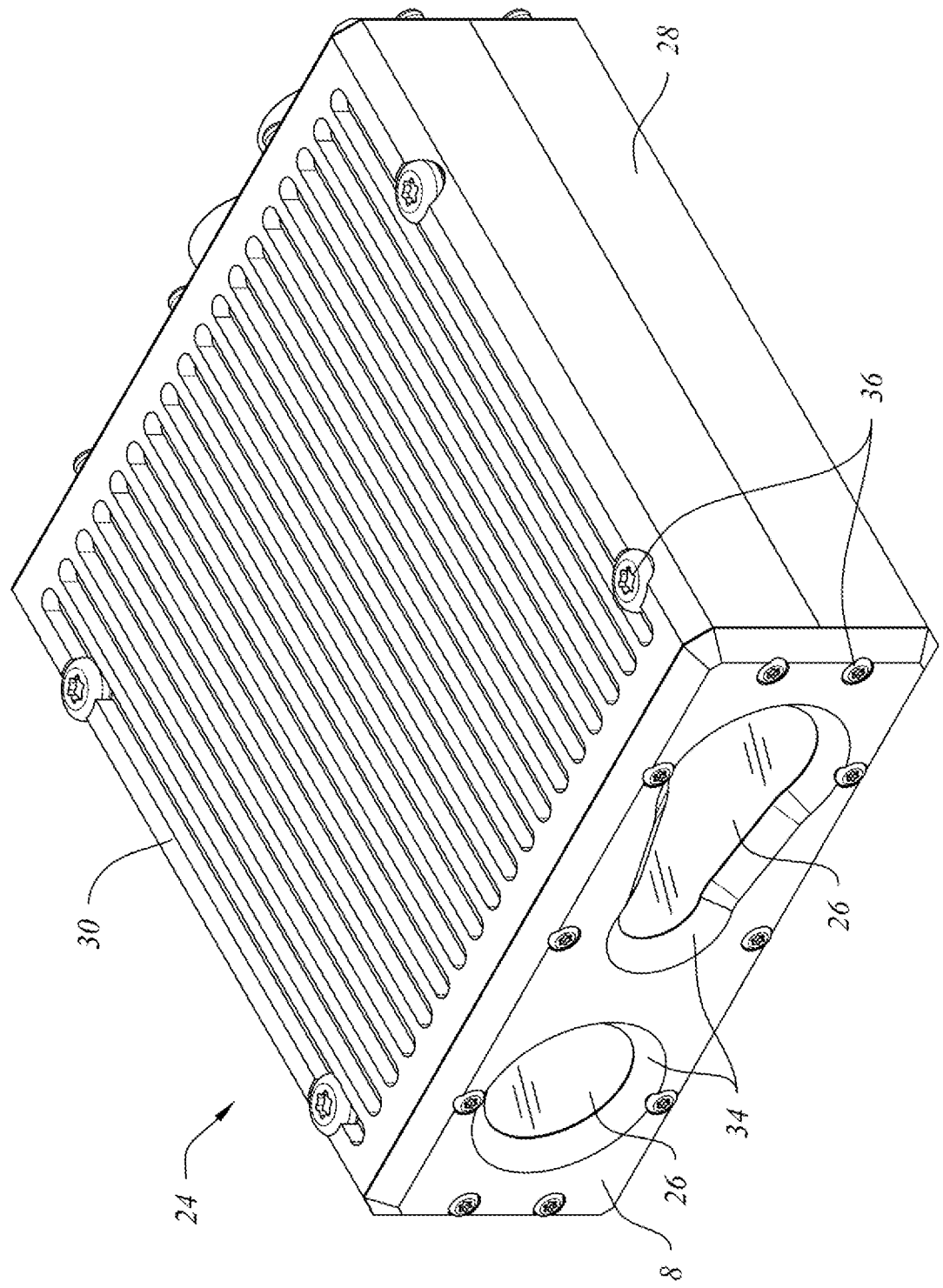
FIG. 10 is a front perspective view of a preferred embodiment of an exterior housing according to the embodiment of FIG. 2.

Referring to FIGS. 1-10, one preferred embodiment of a sensing and computing system 10 for sensing shapes, objects, and other geometric features in industrial environments is depicted. System 10 preferably comprises an imager system 12 an external housing 24, and an internal, integrated CPU/GPU 32. Most preferably, imager system 12 and CPU/GPU 32 are disposed inside a sealed housing 24 to provide protection from the environment in which system 10 will be used. CPU/GPU 32 are preferably disposed inside internal compartment 29 within housing 24. Preferably housing 24 comprises a frame 28, a top cover 30, a front face or covering plate 8, a rear face or cover 38, and a bottom cover 28. A plurality of apertures 36 are disposed on the various components of housing 24 to allow them to be connected together, using screws, for example, to create a sealed housing to protect imager system 12 and CPU/GPU 32. Front cover 8 preferably comprises openings 34 to allow optical access through cover 8 for components of imager system 12. As shown in FIGS. 7A-7B, a recessed area 27 is preferably disposed in a forward facing surface of frame 28 and in top cover 30. Recessed area 27 is configured to receive an optical window 26, which allow optical access for components of imaging system 12 while protecting those components from the exterior environment. Recessed area 27 preferably also covers a lower portion of imaging system 12, with cut-outs around each of the cameras 16, 18 and light source 14, to not block an optical fields of these components. Optical window 26 is preferably held in position in recessed area 27 by front cover 8, which is attached to frame 28. Optical window is preferably a clear optical grade glass with 90% greater visible and infrared light transmissivity, but other grades, visibilities, and transmissivities may also be used. Openings 34 on front cover 8 are aligned with cameras 16, 18 and light source 14 so as to not obstruct the optical fields of these components. Alternatively, one or more glass optical windows 26 may be positioned in opening(s) 34 as part of cover 8 or the windows 26 may be integrated into imager system 12 (such as forming a front face of interior housing 20). Exterior housing 24 also preferably comprises one or more connectors 40 allowing connection of internal components with an external power source and allowing data to be transmitted from CPU/GPU 32 to external devices and networks. Connectors 40 are preferably disposed through rear cover 38, but may also be located on other sides of housing 24.

Imager system 12 preferably comprises at a depth imaging system 16, a color camera 18, a light source or projector 14, and an interior housing 20. Depth imaging system 16 preferably comprises at least one infrared sensitive camera for measuring depth. Infrared camera 16 is preferably a CMOS imaging device with wavelength between 850 nm-980 nm and a minimum resolution of 320×240 pixels, but cameras with other specifications may also be used. Infrared camera 16 is preferably small in size, with a lens size of around 1.0×1.0 cm. Camera 16 also preferably has an interchangeable lens mount to allow flexibility for different application requirements. Color camera 18 is preferably a CMOS imaging device with an infrared blocking filter and a minimum resolution of 640×480 pixels, but cameras with other specifications may also be used. Color camera 18 is preferably small in size, with a lens size of around 1.0×1.0 cm. Camera 18 also preferably has an interchangeable lens mount to allow flexibility for different application requirements. Light source 14 is preferably an infrared structured light class 1 laser projector that is capable of displaying a static pattern at 850 nm. Light source 14 is also preferably small, having a face measuring approximately 1.0×1.0 cm.

During normal operation of sensing and computing system 10, light projector 14 projects a structured light pattern through window 26 onto an object to be imaged/measured, and light bouncing off the object to be imaged is captured by cameras 16. Any light pattern, such as randomized dots or a grid, may be used as long as the pattern is static and does not change while images of the object of interest are being captured. Most preferably, camera 16 is aligned with color camera 18 in the depth and vertical planes, such that the centers of cameras 16, 18 are aligned horizontally and positioned the same distance from front face 8. Interior housing 20 preferably comprises one or more tabs 22 to allow connection to exterior housing 24. Most preferably, each tab 22 has an aperture that aligns with an aperture in a corresponding tab 25 on exterior housing (preferably on frame 28), allowing the two to be connected by a screw. Other attachment methods, such as a snap fit, that allow interior housing 20 to be secured to exterior housing 24 may also be used.

Data or signals collected by camera 16 are transmitted to CPU/GPU 32, which uses pre-programmed algorithms to calculate depth information for the object being imaged using triangulation based on the data/signals from the camera 16. Color data, in red, green, and blue, is collected by color camera 18, which transmits data/signals to CPU/GPU 32 to provide calculated data/information that is supplementary to the calculated depth data. The CPU/GPU 32 is preferably disposed inside external housing 24, between imaging system 12 and rear cover 38. CPU/GPU 32 preferably comprises a main memory 54, a GPU memory 58, and a plurality of GPU processor cores 62. The components of CPU/GPU 32 are connected to imaging system components to receive data/signals from the cameras 16, 18 and to optionally send triggering signals to cameras 16, 18 and light projector 14 to initiate an image capture, and are connected to one or more external data ports 42, 44 to allow CPU/GPU 32 to send and receive data/signals from external components/devices. A software implemented algorithm to perform complex calculations based on image data and model data is preferably stored in main memory 54 for processing using by components of CPU/GPU 32, as further described herein. The CPU/GPU 32 returns results of the calculation to external devices or networks using one or more connections through housing 24 using industrial protocols, such as data transmission an industrial gigabit ethernet connector 42, one or more wireless 802.11 radio antennae 44, and/or industrial serial communications connectors 46. It is not necessary to use an external computer or server to perform calculations on the data/signals from the cameras. Power to the CPU/GPU 32 and components of the imager system 12 is transmitted through the power and serial industrial connector 46. Housing 24 is preferably a sealed aluminum chassis to protect the electronics from dust, debris, water, or any other agent that could harm the electronics. Specifications for one preferred embodiment of the sensing and computing system 10 are provided in Table 1 below.

TABLE 1

| | |
|---|---|
| Size | 135 mm × 35 mm × 105 mm, but other sizes may also be used |
| Weight | 290 grams |
| Resolution Range (color) | 640 × 840 to 1920 × 1080 (max) |
| Resolution Range (depth) | 320 × 240 to 640 × 480 (max) |
| Frame Rate (color) | 5 to 30 fps (preferably 30 fps at @ 1920 × 1080 resolution) |
| Frame Rate (depth) | 5 to 30 fps (preferably 30 fps @ 640 × 480 resolution) |
| Field of View | 45° (vertical) × 60° (horizontal) |
| Range | 0.4-2.8 m |
| Power | 9-14 V DC, 5-10 watts (typical), 18 watts (max) |
| Connectivity | Gigabit Ethernet, 802.11ac WiFi, RS-485 |
| Operating Temperature | 0° C.-50° C. (standard), −25° C. − 80° C. (extended) For operating environments with temperatures at the extreme ends of the extended range, internal components of system 10 with higher temperatures ratings are preferably used. Additionally, software limitations on processing may be introduced to limit heat output when operating in the high end of the extended temperature range. |

Figure 11:
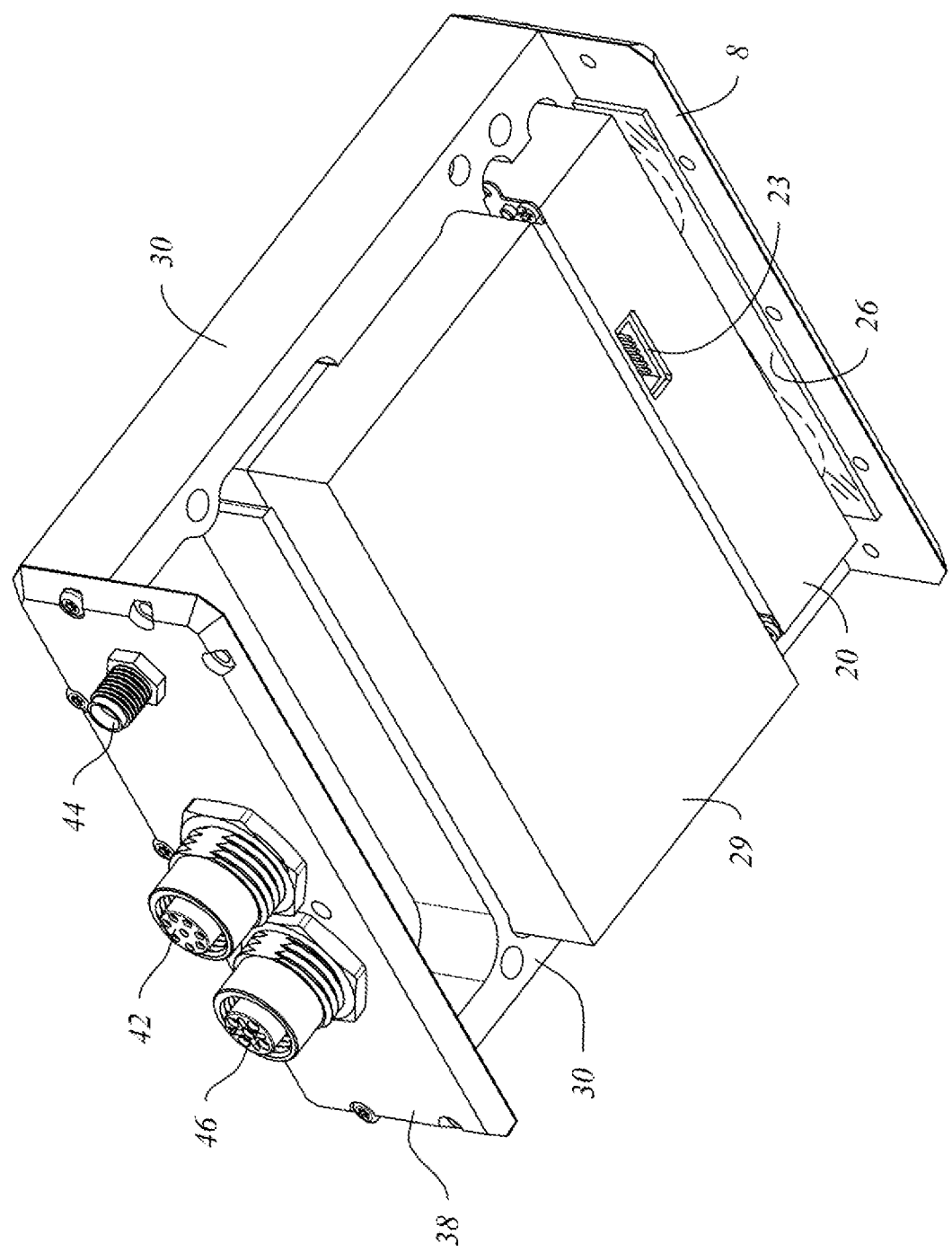
FIG. 11 is an interior bottom perspective view of the embodiment of FIG. 2 with the bottom cover of exterior housing removed.

In another preferred embodiment of a sensing and computing system 210, imager system 12 comprises a depth imaging system having two digital infrared sensitive cameras 16, which form a stereo camera pair, as shown in FIG. 11. When two depth cameras 16 are used in a depth imaging system, they are preferably positioned with overlapping fields of view and known relative position and orientation. When two infrared cameras 16 are use, infrared structured light projector 14 is optional since it is not necessary to project an infrared pattern of the object of interest with two cameras 16. When a sensing and computing system is used under bright ambient light conditions, particularly outdoors with bright sunlight, but also under bright incandescent, halogen, or other artificial light, the ambient light can create infrared interference and wash out the infrared projector 14. Under those conditions it is preferred to use two infrared depth cameras 16 without using light projector 14 (by omitting it from system 210 or disabling it). A pair of depth cameras 16 can generate 3D depth data using stereo triangulation. Stereo triangulation does increase GPU processing in CPU/GPU 32, which generates more heat and uses computational resources, but it also allows for generation of depth data when light projector 14 is not used or available. The other components of system 210 are preferably the same as those with system 10.

In one preferred embodiment, system 10 or 210 is externally triggered for image acquisition via a Gigabit Ethernet, WiFi, or RS-485 interfaces. The external trigger might be provided by a networked computer, industrial control system, or warehouse management network. System 10 or 210 may also be triggered to acquire an image of an object by a timer connected to CPU/GPU 32 or by other sensors connected to CPU/GPU 32 that detect an object is in a field of view of the cameras in imager system 12. Once triggered, CPU/GPU 32 sends a signal to color camera 18 and depth camera 16 to acquire the color and depth images from the color and depth cameras, respectively. This acquisition process would take approximately 33 milliseconds using the preferred embodiment described in Table 1. Once the acquisition is complete, a point cloud data structure may be generated using process 100 described in FIG. 12. After a point cloud 66 is generated, further processing can be applied to gain higher level knowledge of an imaged object, such as with process 110 described in FIG. 13.

Figure 12:
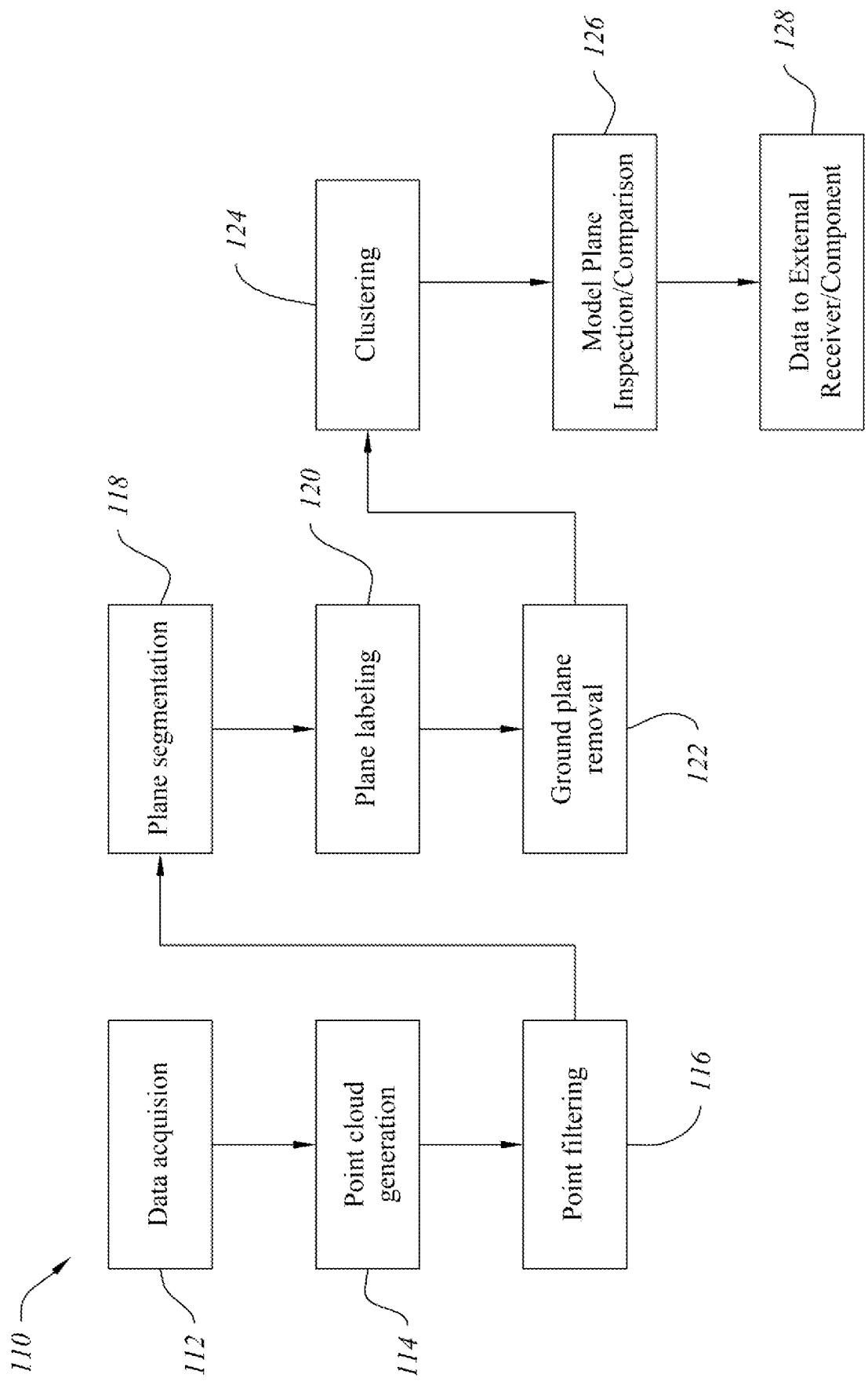
FIG. 12 is a dataflow diagram depicting basic processing steps of a sensing and computing method according to one preferred embodiment of the invention.

Referring to FIGS. 12-16, basic processing steps of a preferred method 110 for generating a point cloud 66 and point-to-plane data 72 for an imaged object are depicted. Most preferably, sensing and computing system 10 or 210 are used with processing method 110 but this method may also be used with other imaging systems. In FIG. 12, basic steps of process 110 are shown. Preferably, method 110 comprises the steps of data acquisition 112, point cloud generation 114, point filtering 116, plane segmentation 118, plane labeling 120, ground plane removal 122, and clustering 124.

Data acquisition step 112 preferably comprises triggering imaging cameras or sensors (such as cameras 16, 18) to acquire images of the object to be measured/analyzed. Data acquisition 112 may be carried out in a continuous/time interval mode, where images are captured and stored in predefined intervals (typically 10-60 frames per second), or may be triggered by an external signal received through a communication port or interface (such as 42, 44, or 46). Light source 14 may also be operated in a continuous/time interval mode or triggered to illuminate the object, if needed. Each time the cameras operate, a single set of image frames from each of the imaging cameras or sensors are taken and stored for further processing. Preferably, RGB camera 18 sends data 50 regarding an RGB image of the object and depth camera system 16 sends data 52 regarding a depth image of the object to main memory 54 of CPU/GPU 32. CPU main memory 54 compiles this data into a combined RGB-Depth image 56. Based on the depth image data 52, a single two-dimensional array of depth values, where each value represents the distance of the visually observed pixel to the camera focal point, is mapped to color pixel information 50 provided by camera 18. The color pixel information encoded into individual red, green, and blue components (RGB), together with the corresponding depth values, is then stored into a single 4 channel RGB+D data frame or image 56 (red, green, blue, and depth channels for each measured pixel). Image data 50, 52 may also optionally be transmitted to external computers for processing into RGB-D data 56 via network communications through ports 42, 44, 46, but is preferably processed directly in system 10 or 210 using CPU/GPU 32.

While the RGB+D data frame 56 is useful for some applications, such as 2D image processing and simple ranging measurements, additional algorithms may be applied to a point cloud mathematical structure, which is particularly useful for dimensioning, localization, mapping, inspection, human-machine interfacing, and control applications. Point cloud generation step 114 preferably comprises sending the RGBD data 56 to GPU memory 58 (or this substep may be part of step 112) and converting the RGB+D data 56 to a 3D XYZ coordinate system, or 3D point cloud of data, 66 using the known focal length, image center, and depth resolution of cameras 16 and 18. Once the depth values are converted to 3D points with x, y, and z components, the corresponding RGB color pixel values from camera 18 are assigned to the point. The result is a collection of 3D points 66 with individual red, green, and blue color component values.

Figure 13:
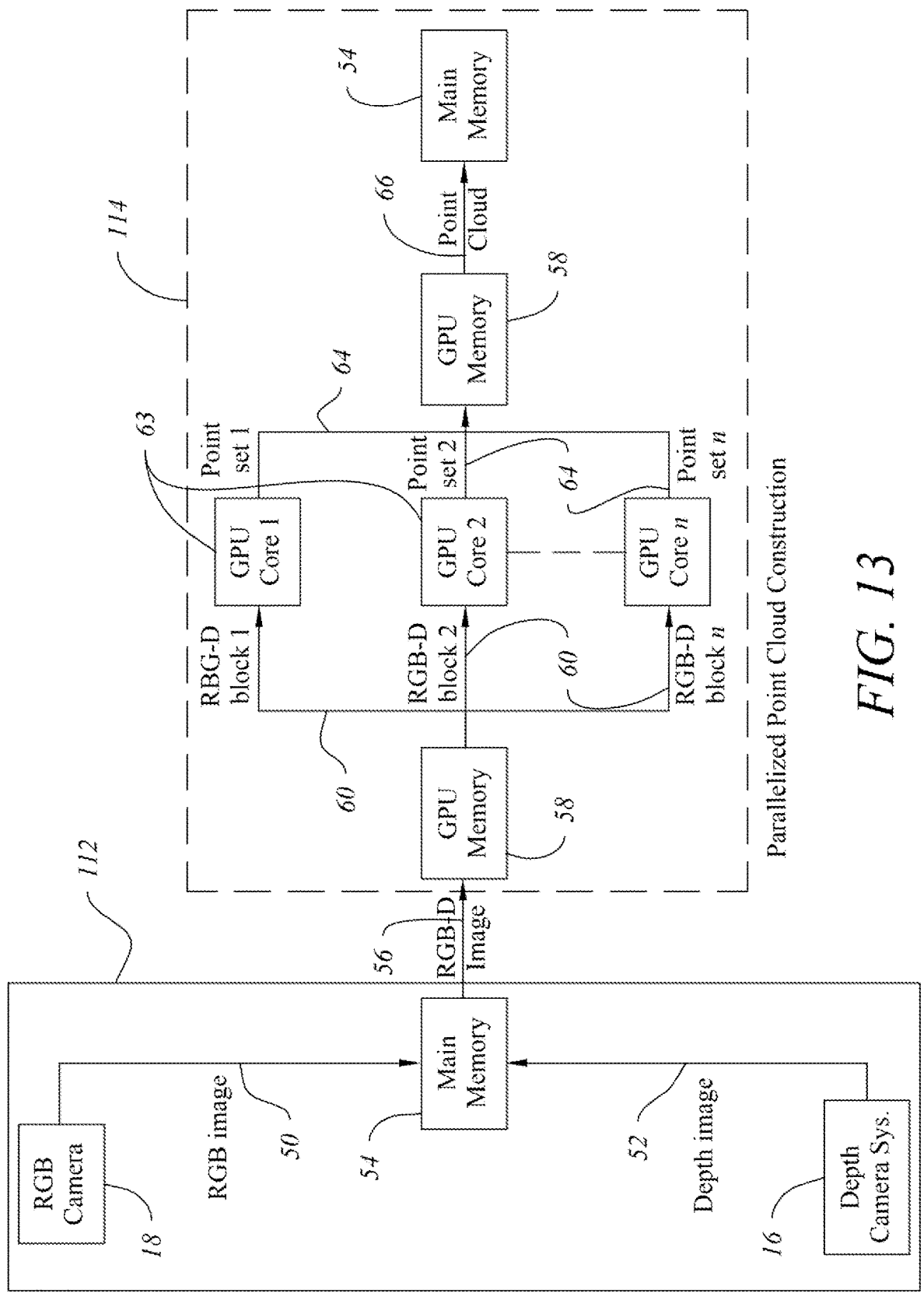
FIG. 13 is a dataflow diagram depicting point cloud construction from color and depth images using parallelized processing in a sensing and computing method according to one preferred embodiment of the invention.

Preferred substeps of point cloud generation step 114 are shown in more detail in FIG. 13. Each pixel of image 56 is broken down into RGB-D blocks 60, each block representing the data associated with multiple pixels in image 56. The number of RGB-D blocks 60 (60-1 through 60-*n*) will correspond to the resolution of the image (for example, VGA resolution is 640×480 pixels, which will have 256 RGB-D blocks, 60-1 through 60-256). RGB-D blocks 60 are preferably sent to a plurality of GPU parallel processing cores 62 to create point sets 64. In order to create a single 3D data point (such a point set 64-1), the horizontal and vertical positions (x-axis and y-axis) of a particular pixel in the depth image plane are used by a GPU core 62 (such as core 62-1) to compute a direction vector extending outward from the focal point of the depth camera 16 toward the field of view in which the object is located to determine the position in the depth plane (z-axis). The coordinates of the desired 3D point (x, y, and z) are then obtained by a GPU core 62 by projecting the direction vector outward from the camera focal point to the distance stored by the depth image pixel. Color data can also be added to each point set 64, if necessary, by accessing the color data in the appropriate RGB-D block 60. Each point set 64 is then sent back to GPU memory 58 which compiles the point set data into a point cloud 66 that is sent to CPU main memory 54.

In a typical non-parallelized processing algorithm, each 3D point is computed by traversing all pixels in the depth and color images individually. For depth images stored with VGA resolution (640×480 pixels), this results in 307, 200 individual processing operations, which would take longer to process using non-parallelized processing. A preferred parallelized GPU processer in CPU/GPU 32, however, is able to perform batch processing operations simultaneously by distributing the computational load amongst multiple processing cores 62-1 through 62-*n*. In one preferred embodiment, for example, a GPU with 256 processing cores (62-1 through 62-256) could complete the same processing task over 200 times faster than non-parallelized processing.

Optional point filtering step 116 may be used to filter out unnecessary data and sensor noise, which makes further downstream processing faster and reduces required memory storage space. Once the point cloud 66 has been obtained, points that lie outside of a given range of interest can be removed prior to additional steps. In a typical application performed with a sensing and measurement device (such as system 10 or 210) mounted at a static location or on an industrial robot arm, the dimensions of the workspace may be known. Points within the field of view of cameras 16, 18 that are captured with the image of the object but lie outside of this area of interest or whose Euclidean distance from the sensing device is too far can be removed from the point cloud. Additionally, measurement errors present due to sensor noise may be removed using standard 3D filters, such as a moving median, moving average, Gaussian filter, or bilateral filter.

In a typical human-centric environment, such as an industrial warehouse or factory, many structural surfaces that are typically found around the object of interest exhibit a planar structure. These environmental structures, such as walls, floors, tabletops, can be detected along with the object of interest, such as a box, and expressed using the planar equation $Ax+By+Cz+D=0$, where $\{x, y, z\}$ corresponds to the 3D components of a given point on the plane, and $\{A, B, C, D\}$ are coefficients describing the position and orientation of the plane with respect to the sensing device. Plane segmentation step 118 preferably comprises identifying planes within the point cloud 66 (and most preferably on point cloud 66 after filtering in step 116) by testing each point's distance to a given $\{A, B, C, D\}$ combination, and identifying plane models which contain a sufficient number of inliers. This process can be achieved using either an exhaustive test of plane models, or a randomized sample consensus based approach in which only a certain percentage or certain specific plane models are tested. For example, a "RANdom SAmple Consensus", or RANSAC, approach may be used by selecting sets of 3 random points, computing the plane defined by the 3 points, then determining how many other points lie sufficiently close to that plane, then repeating this process until an ABCD set that contains a sufficient amount of points is determined. The cutoff amount depends for determining a sufficient proximity and number of points will depend on the distance to the plane being observed and the minimum overall size being considered (for example, planes with 10 points may be too small, but planes with 1000 may be sufficient), as will be understood by those of ordinary skill in the art.

Figure 14:
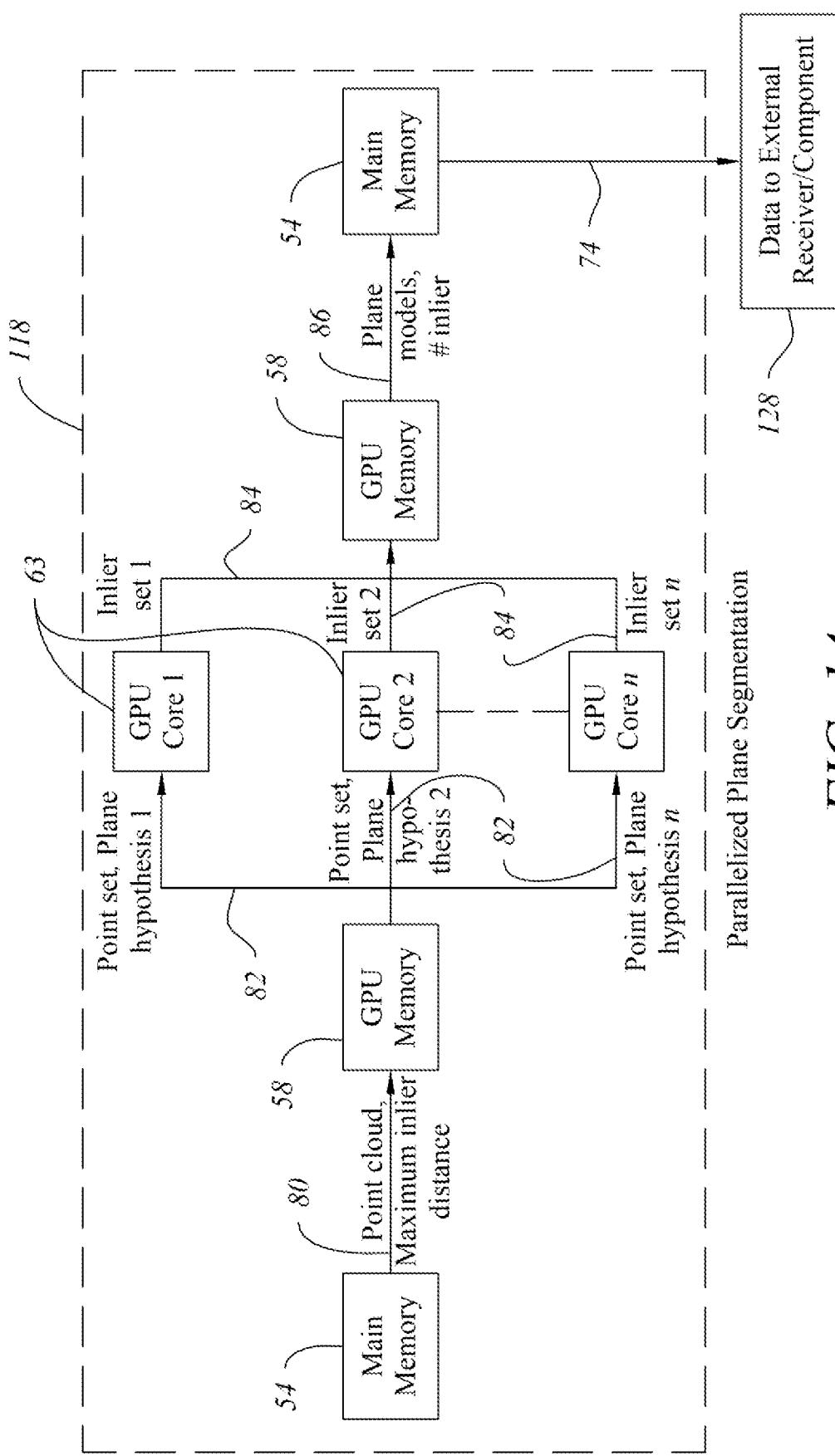
FIG. 14 is a dataflow diagram depicting parallelized plane segmentation processing in a sensing and computing method according to one preferred embodiment of the invention.

In a preferred embodiment, a parallelized plane segmentation step 118 is used, as shown in FIG. 14. Plane segmentation step 118 preferably compares the points of a point cloud 66 provided by processing step 114 or a similar process to a predetermined maximum inlier distance to determine if the points sufficiently close to a plane defined by a pre-computed mathematical model associated with the object. Point cloud data and the maximum inlier distance 80 are sent from main memory 54 to GPU memory 58. GPU memory 58 breaks down the point cloud and maximum inlier distance 80 data into multiple point set—plane hypotheses 82, each having an input point set with an $\{A, B, C, D\}$ plane model hypothesis for the object defined by 3 randomly chosen points, as instructed by main memory 54. Points that lie sufficiently close to the plane model are marked as inliers to that plane 84, and the total number of plane inliers for the given model is computed after all points in the input dataset are checked. If a sufficient number of points lie on a given plane model hypothesis 82, that model 86 is assumed to be valid and copied to main memory 54. This process repeats until either a sufficient amount of points in the input data set have been assigned to a plane models (for example, 50% of the points are assigned to valid plane models), or a predefined amount of iterations have been exhausted. The iteration limit is used to constrain processing time in the case where few planes can be located within the input point set.

Once planes and their corresponding inlier points have been identified, the $\{A, B, C, D\}$ parameters can be inspected for orientation relative to the sensing/camera device (such as system 10 or 210) in plane labeling step 120. If the position of the sensing/camera device relative to the ground is known (as would be the case in statically mounted or robot arm installations), planes can be labeled as horizontal or vertical relative to the hypothetical ground plane. Additionally, planes may be sorted by their distance to the sensing device or total number of inlier points. This approach can be used to infer that certain planes correspond to vertical walls, horizontal worksurfaces, flooring, or other items of interest.

In applications involving material handling, object manipulation, or other industrial applications, items on a floor or work surface may need to be identified, measured, and manipulated. One approach to identifying these objects is to locate the ground plane or work surface plane from the previous step 120 and remove those points from the point cloud 66 in the ground plane removal step 122. The remaining points will be all points that lie above the floor or work surface, such as boxes, packages, or other items of interest. Palletizing or depalletizing of boxes in a warehouse, manipulation of manufacturing components, and other material handling applications may benefit from this step.

Figure 15:
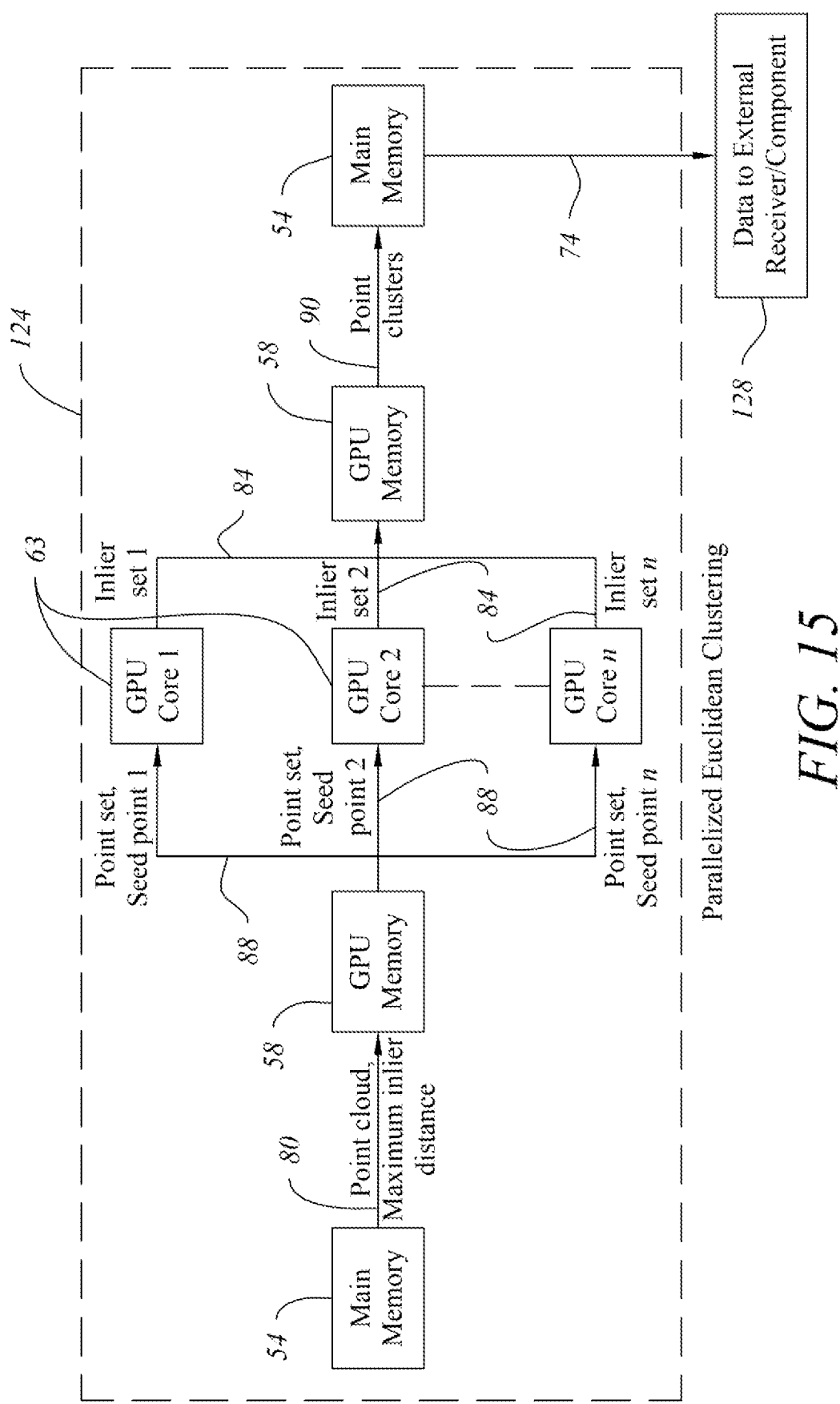
FIG. 15 is a dataflow diagram depicting parallelized Euclidean clustering processing in a sensing and computing method according to one preferred embodiment of the invention.
Figure 16:
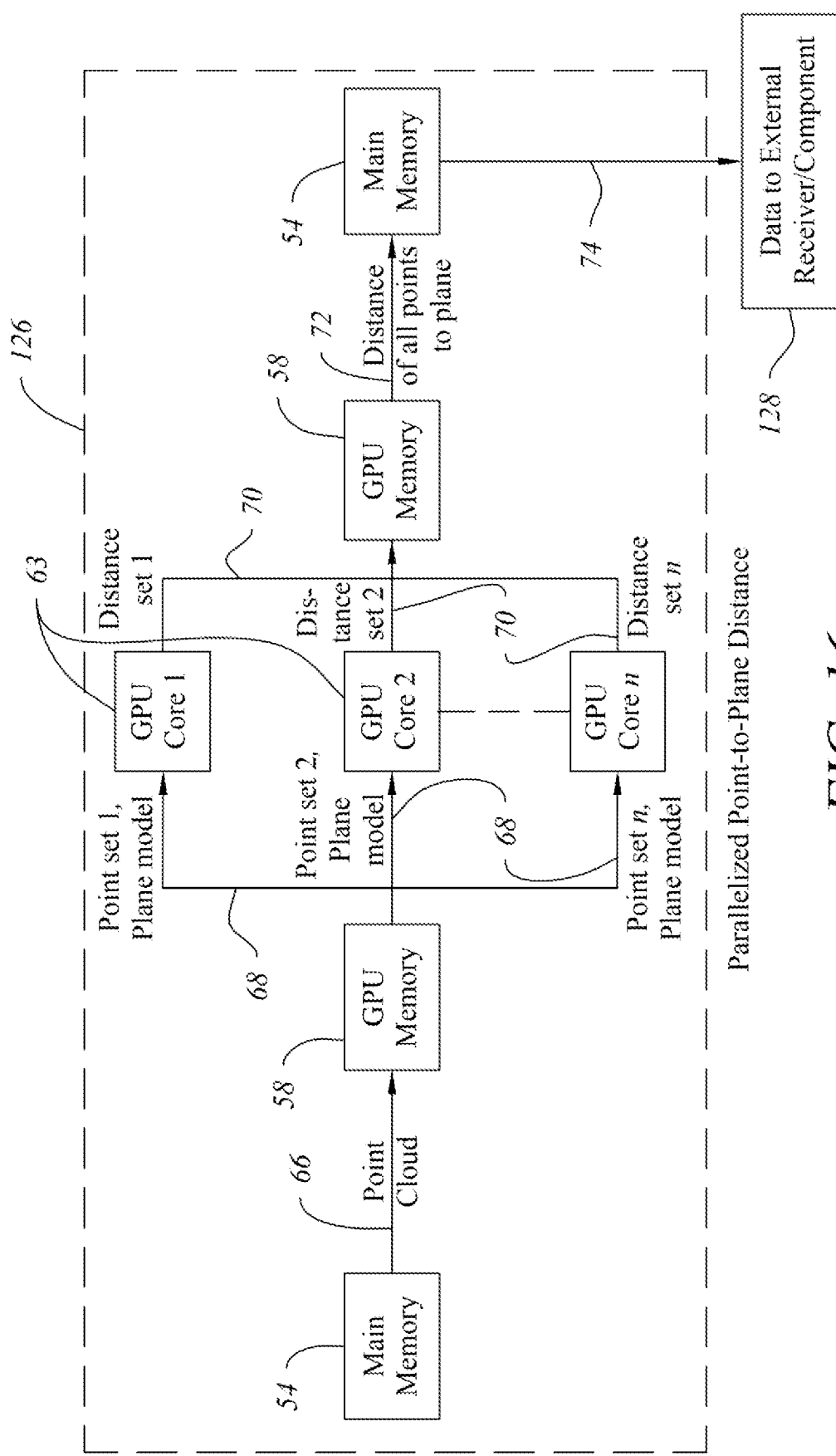
FIG. 16 is a dataflow diagram depicting the computation of point-to-plane distances using parallelized processing in a sensing and computing method according to one preferred embodiment of the invention.

Once environmental structural planes, such as the ground, walls, and worksurfaces have been removed from the point cloud at step 122, remaining points can be assumed to belong to objects of interest. Individual clusters can be identified at step 124 using K-means clustering or other known algorithms, which assign points that lie within a maximum distance threshold to other cluster points to the cluster. In a preferred parallelized approach for clustering step 124 as shown in FIG. 15, point cloud data is provided to individual GPU cores 63 along with a randomly chosen seed point 88 (one per core). Each GPU core 63 searches for points within a specified maximum inlier distance from the seed point, according to predefined information for the object of interest, as instructed by main memory 54 or GPU memory 58. All points lying sufficiently close to the seed point are then searched for inliers in a similar fashion. This process repeats within the GPU core 63 until no further neighboring points can be added to the inlier list 84. This resulting inlier list 84 is then defined by GPU memory 58 to be a cluster of points 90, which corresponds to a physical object in 3D space. Seed points 88 are sequentially provided to individual GPU cores 63 until all points in the initial input point set 88 are assigned to a cluster 90 with other points, or in the case of isolated points without sufficiently close neighboring points, by themselves. Contiguous clusters of points 90 will generally correspond to single or multiple objects in the sensing device field of view, and can be further inspected for dimensional measurements, volume, visual markers, center of mass position, grasp points, etc. at step 126.

Steps 118-124 are preferred, but optional steps. Point cloud data 66 may proceed directly to an external receiver/component step 126 as shown in FIG. 12. Additionally, steps 118-124 may be integrated into step 126 if the model includes specifications regarding the imaged object and the surrounding image environment (such as walls, workspaces, flooring, etc.); however, it is preferred to perform these steps separately as some actions can be parallelized on the GPU more easily than others and because information regarding the environment of operation is not always known or constant.

Preferred substeps of inspection/comparison step 126 are shown in more detail in FIG. 14. Inspection/comparison step 126 preferably compares the points of a point cloud 66 provided by processing step 114 or a similar process are checked to see if they lie sufficiently close to a plane defined by a pre-computed mathematical model associated with the object, similar to plane comparison in steps 118-122 for comparison to a mathematical model regarding the image environment. One or more pre-computed mathematical models may be stored in CPU main memory 54 for various objects that are to be imaged by sensing and computing system 10 or 210. These models contain data regarding specifications that the object should meet, such as its shape, depth, spatial dimensions, occupied or unoccupied volume, color, position, orientation, or the presence of visual markers or text information. These models may also contain tolerances or variances on those specifications. For example, if the object is box, the model may provide base dimensions and thresholds or tolerances for above or below the base dimensions within which the box is supposed to fall, such as 10 inches wide +/−0.5 inches, 12 inches high +/−1 inch, and 12 inches deep +/−2 inches or that its occupied volume should be no less than 90% of the total volume.

Multiple models may be stored for each object or for different objects (such as different sized boxes or for each image environment for steps 118-122). In order to compare the point cloud 66 to the model data, the point cloud data must be broken down into individual points that are compared to corresponding points in the model. Most preferably, clustered points from step 124 are compared. It is not necessary to compare every point (or pixel from the image) to the model, provided that a sufficiently large number of points (such as 20% or more, depending on distance to camera, field of view, model size and related factors as will be understood by one of ordinary skill in the art) are compared. For example, a 12" cube box viewed from roughly 6' away will have a few thousand points per visible face (at most 3 faces), so somewhere between 3000 and 10,000 points per model; however, system 10 or 210 can downsample the point cloud and use far fewer points (such as few hundred) to model the box. Additionally, one model may require comparison of certain points and another model may require comparison of different points or some of the same points and some different points. GPU memory 58 breaks down point cloud 66 into multiple point sets 68 associated with a plane model for the object as instructed by main memory 54. These point sets 68 are sent to a plurality of GPU parallel processing cores 62 to calculate distance sets 70, corresponding to the distance of each point on the point cloud 66 (generated from the images of the actual object) to the corresponding point in the pre-programmed mathematical model for the object. Each distance set 70 is sent to GPU memory 58, which compiles them into point-to-plane data 72 sent to CPU main memory 54. Batches of points sets 68 can be processed by the GPU cores simultaneously, to acquire the corresponding distance sets 70 (distance of each point to the plane).

Once these distances are acquired from each batch, the resulting point-to-plane data 72 is transferred to CPU main memory 54 for storage for later use or to send data/instructions 74 to an external component. Point-to-plane data 72 or distance data sets 70 may be compared to pre-determined or pre-programmed thresholds by CPU/GPU 32 to send instructions or data 74 to external components. For example, if point-to-plane data or distance data indicates the object is outside the tolerances for a particular dimension or is outside of a specification by a given percentage, then certain actions (such as rejection) are taken with respect to that object. Similar point-to-plane data and distance data sets are determined for environmental models in steps 118-122, as previously described.

At step 128, any data or information 74 generated by CPU/GPU 32, such as point cloud 66 or point-to-plane data 72, may be sent to a desired location or external component through the Gigabit Ethernet, WiFi, or RS-485 interfaces (such as 42, 44, 46 in system 10 or 210). For example, if the point-to-plane data 72 indicates that the object is not within the specifications/parameters for its model, then CPU/GPU 32 may send data/instructions 74 to a controller for the system processing the object indicating that the object should rejected by diverting it from a primary conveyor to a secondary conveyor. Similarly, when multiple models are used to indicate different objects (such as boxes of different sizes), then the point-to-plane data 72 may be used to differentiate between the boxes with appropriate actions taken by the system processing the object downstream of the sensing and computing system 10, such as diverting larger boxes to a second conveyor and smaller boxes to a third conveyor.

This capability forms the foundation for many industrial perception processes involving flat surfaces, such as conveyors, warehouse floors, product pallets, shipping, box packaging, etc. Numerous variations on the models, comparisons, and downstream actions to be taken (if desired) based on the comparisons may be used with processing method 110, as will be understood by those of ordinary skill in the art. Depending on the complexity of the high-level processing steps in process 110, for example, the total time between triggering an image capture and generating the solution data or information 74 is preferably within the range of 33 milliseconds to a few seconds. A typical box dimensioning application relying heavily on the processes described in FIGS. 13 and 14 might take around 100 milliseconds from image capture to final data 74. These fast processing times are the result of using a plurality of parallel GPU processing cores 62. In commercial and industrial applications, it is important to be able to process the image data quickly so that actions downstream of sensing and computing system 10 or 210, such as rejecting an object for failure to pass inspection/specification criteria, diverting an object to another conveyor, etc., can be taken in a timely manner without requiring a slow-down in overall processing of the objects being imaged by sensing and computing system 10 or 210.

Sensing and computing systems according to the invention, such as system 10 or 210, may be used to measure multiple parameters of an object, such as shape, depth, spatial dimensions, occupied or unoccupied volume, color, position, orientation, and/or the presence of visual or text markers (QR codes, bar codes, textual information, etc.) as will be understood b those of ordinary skill in the art. Additionally, the CPU/GPU will require programming specific to the parameter being measured. References herein to calculating or measuring a value or parameter and the like are intended to include any form of direct measurement, converting data or a signal, making a calculation based on one or more data points or signals, or otherwise comparing, interpreting, correlating, or manipulating one or more data points or signals. Those of ordinary skill in the art will also appreciate upon reading this specification and the description of preferred embodiments herein that modifications and alterations to the system may be made within the scope of the invention and it is intended that the scope of the invention disclosed herein be limited only by the broadest interpretation of the appended claims to which the inventors are legally entitled.

We claim:

1. A method of determining one or more parameters of an object, the method comprising:
    obtaining color information regarding the object and optionally of at least one structure around the object using a color camera;

obtaining depth information regarding the object and optionally of the at least one structure around the object using a depth imager system comprising an infrared sensitive camera;

compiling the color information and depth information into an RBG-D data frame comprising a plurality of pixels using a CPU system configured to receive data or signals corresponding to the color information from the color camera and data or signals corresponding to the depth information from the depth imager system;

generating a point cloud from the RGB-D data frame using the CPU system, wherein the point cloud comprises a plurality of three-dimensional points; and calculating the one or more parameters of the object, optionally one or more parameters of the at least one structure around the object, or both based on the RGB-D data frame, the point cloud, the color information, the depth information, or a combination thereof using the CPU system;

and wherein the CPU system comprises an internal central processing unit, a graphics processing unit having a plurality of parallel graphics processing cores, and memory.

2. The method of claim 1 wherein the generating a point cloud step comprises:

generating a plurality of RGB-D blocks, each block comprising a set of pixels from the RGB-D data frame;

distributing a computational load among the plurality of parallel graphics processing cores by sending each RGB-D block to one of the plurality of parallel graphics processing cores;

simultaneously calculating multiple of the plurality of three-dimensional points using the plurality of parallel graphics processing cores by determining a position of at least some of the pixels in each RGB-D block in a horizontal plane, a vertical plane, and a depth plane, and wherein each three-dimensional point corresponds to a particular one of the pixels for which the position is determined; and compiling each three-dimensional point into the point cloud.

3. The method of claim 2 wherein the simultaneously calculating the plurality of three-dimensional points step comprises:

computing a direction vector for each of the pixels for which a position is determined based on the position of the pixel in the horizontal plane and in the vertical plane; and determining the position of the pixel in the depth plane by projecting the direction vector outward from a focal point of the infrared sensitive camera toward a field of view in which the object is located to a distance in the RGB-D date frame for the pixel.

4. The method of claim 2 further comprising filtering the point cloud by (1) defining an area of interest and removing points that lie outside the area of interest or (2) determining a Euclidian distance from the infrared camera for at least some points and removing points that have a Euclidian distance exceeding a predetermined threshold.

5. The method of claim 2 further comprising:

storing an object plane model in the memory, wherein the object plane model comprises three-dimensional point specifications that the object is intended to meet;

optionally storing a structure plane model in the memory, wherein the structure plane model comprises three-dimensional point specifications regarding the at least one structure around the object or specifications regarding the object in relation to the at least one structure around the object or both;

creating a plurality of point sets by associating each of a set of points in the point cloud with each of a corresponding set of three dimensional point specifications from the object plane model, the optional structure plane model, or both;

for each point set, calculating a distance between the position of the point cloud point and the three-dimensional point specification in the point set to generate distance data for each point set; and optionally compiling point-to-plane data from the distance data.

6. The method of claim 5 further comprising comparing the distance data or the optional point-to-plane data to a predetermined threshold or set of values for the object or the at least one structure around the object or both and sending a signal to an external component if the comparison is above or below the predetermined threshold or set of values.

7. The method of claim 1 further comprising directing light at the object, wherein the light is a infrared laser displaying a static pattern at 850 nm and wherein the depth imager system comprises a single infrared camera.

8. The method of claim 1 wherein the depth imager system comprises a stereo pair of infrared cameras and method further comprises generating 3D depth data using stereo triangulation.

9. The method of claim 2 further comprising:

selecting a random seed point for each of the plurality of parallel graphics processing cores;

sending a portion of the point cloud to each of the plurality of parallel graphics processing cores;

simultaneously searching for inlier points using the plurality of parallel graphics processing cores, wherein the inlier points are points within the portion of the point cloud being searched by the particular one of the parallel graphics processing cores that are within a predetermined maximum distance from the seed point for that processing core;

creating a cluster of points for each processing core from the inlier points for that core.

10. The method of claim 9 further comprising:

storing an object plane model in the memory, wherein the object plane model comprises three-dimensional point specifications that the object is intended to meet;

optionally storing a structure plane model in the memory, wherein the structure plane model comprises three-dimensional point specifications regarding the at least one structure around the object or specifications regarding the object in relation to the at least one structure around the object or both; and wherein the calculating the one or more parameters step comprises comparing each cluster of points to the object plane model or a portion thereof, the optional structure plane model or a portion thereof, or both.

11. A sensing and computing system for producing information regarding one or more parameters of an object, the system comprising:

a depth imager system comprising an infrared sensitive camera;

a color camera;

a CPU system comprising an internal central processing unit, internal graphics processing unit having a plurality of parallel graphics processing cores, and memory; and wherein the CPU system is configured to (1) receive data or signals from the depth imager system corresponding to depth information regarding the object and optionally regarding at least one structure around the object; (2) receive data or signals from the color camera corresponding to color information regarding the object and optionally at least one structure around the object; (3) compile the depth information and color information into an RGB-D data frame comprising a plurality of pixels; (4) generate a point cloud from the RGB-D data frame, wherein the point cloud comprises a plurality of three-dimensional points; and (4) calculate the one or more parameters of the object, and optionally one or more parameters of the at least one structure around the objection, or both, based on the RGB-D data frame, the point cloud, the depth information, the color information, or a combination thereof.

12. The sensing and computing system of claim 11 wherein the depth
imager system comprises a stereo pair of infrared sensitive cameras.

13. The sensing and computing system of claim 12 wherein (1) the infrared cameras are aligned in a depth plane and in a vertical plane with the color camera or (2) the sensing and computing system does not comprise an infrared light source or (3) both.

14. The sensing and computing system of claim 11 further comprising an infrared light source for directing infrared light to the object and wherein the depth imager system comprises a single infrared sensitive camera.

15. The sensing and computing system of claim 14 wherein the light source is a laser projector that projects a static pattern of infrared light on the object.

16. The sensing and computing system of claim 11 further comprising a laser projector that projects infrared light on the object; and
wherein (1) the infrared sensitive camera is aligned in a depth plane and in a vertical plane with the color camera, or (2) the laser projector is configured to display the static pattern at 850 nm, or (3) both.

17. The sensing and computing system of claim 11 wherein the one or more parameters of the object and optional one or more parameters of the at least one structure around the object comprise one or more of geometric shape, depth, spatial dimensions, occupied or unoccupied volume, color, position, orientation, the presence of visual markers or text information.

18. The sensing and computing system of claim 11 wherein the wherein the CPU system is further configured to (1) generate a plurality of RGB-D blocks, each block comprising a set of pixels from the RGB-D data frame; (2) distribute a computational load among the plurality of parallel graphics processing cores; (3) simultaneously calculate multiple of the three-dimensional points in the point cloud using the plurality of parallel graphics processing cores by determining a position of at least some of the pixels in each RGB-D block in a horizontal plane, a vertical plane, and a depth plane, and wherein each three-dimensional point in the point cloud corresponds to a particular one of the pixels for which the position is determined; and (4) compile each three-dimensional pixel into the point cloud.

19. The sensing and computing system of claim 18 wherein the CPU system is further configured to (1) store in the memory an object plane model, wherein the object plane model comprises three-dimensional point specifications that the object is intended to meet; (2) optionally store in the memory, a structure plane model, wherein the structure plane model comprises three-dimensional point specifications regarding the at least one structure around the object, or specifications regarding the object in relation to the at least one structure around the object, or both; (3) create a plurality of point sets by associating each of a set of points in the point cloud with each of a corresponding set of three-dimensional point specification from the object plane model, the optional structure plane model, or both; and (4) for each point set, calculate a distance between the position of the point cloud point and the three-dimensional point specification in the point set to generate distance data for each point set.

20. The sensing and computing system of claim 19 wherein the CPU system is further configured to: (1) optionally compile point-to-plane data from the distance data; and (2) compare the distance data or the point-to-plane data to a predetermined threshold or set of values for the object or optionally the at least one structure or both; and (3) send a signal to an external component if the comparison is above or below the predetermined threshold or set of values.

* * * * *